(12) United States Patent
Choi et al.

(10) Patent No.: US 11,567,359 B2
(45) Date of Patent: Jan. 31, 2023

(54) DISPLAY PANEL AND DISPLAY APPARATUS INCLUDING SAME

(71) Applicant: SAMSUNG ELECTRONICS CO., LTD., Suwon-si (KR)

(72) Inventors: Sungho Choi, Suwon-si (KR); Sungho Kim, Suwon-si (KR); Jeongphil Seo, Suwon-si (KR); Junghyun Yoon, Suwon-si (KR); Minnyeong Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/212,490

(22) Filed: Mar. 25, 2021

(65) Prior Publication Data

US 2021/0302782 A1    Sep. 30, 2021

Related U.S. Application Data

(60) Provisional application No. 62/994,485, filed on Mar. 25, 2020.

(30) Foreign Application Priority Data

May 19, 2020    (KR) .................... 10-2020-0059973

(51) Int. Cl.
    *G02F 1/1335*    (2006.01)
    *G02F 1/1333*    (2006.01)
    *G02F 1/1339*    (2006.01)

(52) U.S. Cl.
    CPC ...... *G02F 1/133514* (2013.01); *G02F 1/1339* (2013.01); *G02F 1/133331* (2021.01); *G02F 1/133512* (2013.01); *G02F 1/133531* (2021.01)

(58) Field of Classification Search
    CPC combination set(s) only.
    See application file for complete search history.

(56) References Cited

U.S. PATENT DOCUMENTS

7,023,518 B1 *  4/2006  Koyama ........... G02F 1/136204
                                                         349/151
7,050,131 B2    5/2006  Choi et al.
                        (Continued)

FOREIGN PATENT DOCUMENTS

CN    110687715 A    1/2020
JP      4605241 B2   1/2011
                (Continued)

OTHER PUBLICATIONS

International Search Report (PCT/ISA/210) dated Jul. 12, 2021 by the International Searching Authority in counterpart International Patent Application No. PCT/KR2021/003641.
(Continued)

*Primary Examiner* — Hoan C Nguyen
(74) *Attorney, Agent, or Firm* — Sughrue Mion, PLLC

(57) ABSTRACT

A display panel and a display apparatus are provided. The display panel may include a first glass substrate; a second glass substrate provided in front of the first glass substrate in a first direction; and a color filter layer provided between the second glass substrate and the first glass substrate in the first direction. The color filter layer may include a plurality of color filters and a black matrix surrounding the plurality of color filters. A side edge of the black matrix may extend beyond a side edge of the first glass substrate in a second direction that is orthogonal to the first direction. The display apparatus may include a backlight unit and the display panel.

14 Claims, 6 Drawing Sheets

(56) References Cited

U.S. PATENT DOCUMENTS

| | | | |
|---|---|---|---|
| 7,245,333 B2 | 7/2007 | Nam et al. | |
| 8,253,916 B2* | 8/2012 | Park | G02F 1/13394 |
| | | | 349/155 |
| 9,989,812 B2 | 6/2018 | Wu et al. | |
| 10,768,467 B2 | 9/2020 | Baek et al. | |
| 2003/0133070 A1 | 7/2003 | Nam et al. | |
| 2004/0075801 A1 | 4/2004 | Choi et al. | |
| 2009/0114888 A1* | 5/2009 | Nishida | G02F 1/133516 |
| | | | 252/586 |
| 2013/0058020 A1* | 3/2013 | Jo | G02F 1/1345 |
| | | | 361/679.01 |
| 2013/0278858 A1* | 10/2013 | Hashimoto | G02F 1/133512 |
| | | | 349/58 |
| 2014/0368774 A1* | 12/2014 | Iyama | G02F 1/133512 |
| | | | 349/110 |
| 2017/0309689 A1* | 10/2017 | Li | H01L 27/3244 |
| 2019/0377221 A1 | 12/2019 | Baek et al. | |

FOREIGN PATENT DOCUMENTS

| | | |
|---|---|---|
| KR | 10-0437593 B1 | 6/2004 |
| KR | 10-0442491 B1 | 7/2004 |
| KR | 10-2006-0133821 A | 12/2006 |
| KR | 10-0906410 B1 | 7/2009 |
| KR | 10-2014-0022154 A | 2/2014 |
| KR | 10-1660976 B1 | 9/2016 |
| KR | 10-2017-0080221 A | 7/2017 |
| KR | 10-1982139 B1 | 5/2019 |
| KR | 10-2019-0139047 A | 12/2019 |

OTHER PUBLICATIONS

Written Opinion (PCT/ISA/237) dated Jul. 12, 2021 by the International Searching Authority in counterpart International Patent Application No. PCT/KR2021/003641.

* cited by examiner

DISPLAY PANEL AND DISPLAY APPARATUS INCLUDING SAME

CROSS-REFERENCE TO RELATED APPLICATION(S)

This application is based on and claims priority under 35 U.S.C. § 119 to U.S. Provisional Patent Application Ser. No. 62/994,495, filed on Mar. 25, 2020, in the U.S. Patent and Trademark Office, and Korean Patent Application No. 10-2020-0059973, filed on May 19, 2020, in the Korean Intellectual Property Office, the disclosures of which are incorporated by reference herein in their entireties.

BACKGROUND

1. Field

The disclosure relates to a display panel and a display apparatus including the same, and, more particularly, to a display panel having a structure for preventing or reducing light leakage from side surfaces of the display panel and a display apparatus including the same.

2. Description of Related Art

In general, a display apparatus is used in various fields, such as in a home or an office, as a type of an output apparatus for visually displaying data and images of characters, figures, and the like.

In recent years, in the display apparatus, a bezel area that does not output an image is formed to be thin by removing a front sash. Accordingly, the display apparatus may have a sleek design and increase a viewing immersion level of a user.

However, if the front sash is removed from the display apparatus, then a light leakage phenomenon may occur in an edge area of the display apparatus.

SUMMARY

According to an aspect of the disclosure, a display panel may include a first glass substrate; a second glass substrate provided in front of the first glass substrate in a first direction; and a color filter layer provided between the second glass substrate and the first glass substrate in the first direction. The color filter layer may include a plurality of color filters and a black matrix surrounding the plurality of color filters. A side edge of the black matrix may extend beyond a side edge of the first glass substrate in a second direction that is orthogonal to the first direction.

The side edge of the black matrix may extend beyond the side edge of the first glass substrate by about 0.2 mm to about 0.8 mm.

The side edge of the black matrix may be planar with a side edge of the second glass substrate.

The display panel may include a case configured to support a rear surface of the first glass substrate. The case may have a side wall area and a support area that protrudes towards a center of the display panel in the second direction.

The display panel may include a bonding member provided between the first glass substrate and the support area in the first direction to fix the first glass substrate.

A first distance between the side edge of the first glass substrate and the side wall area in the second direction may be greater than a second distance between the side edge of the black matrix and the side wall area in the second direction.

A light shielding member may be provided on an inner surface of the side wall area.

A sealing member may surround the side edge of the first glass substrate and a side edge of the second glass substrate.

The display panel may include a first polarization plate provided behind the first glass substrate in the first direction; and a second polarization plate provided in front of the second glass substrate in the first direction. The first glass substrate may include a thin film transistor.

According to an aspect of the disclosure, a display apparatus may include a backlight unit; and a display panel provided in front of the backlight unit in a first direction. The display panel may include a first glass substrate; a second glass substrate provided in front of the first glass substrate in the first direction; and a color filter layer provided between the second glass substrate and the first glass substrate in the first direction. The color filter layer may include a plurality of color filters and a black matrix surrounding the plurality of color filters. The side edge of the black matrix may extend beyond a side edge of the first glass substrate in a second direction that is orthogonal to the first direction.

The side edge of the black matrix may extend beyond the side edge of the first glass substrate by about 0.2 mm to about 0.8 mm.

The side edge of the black matrix may be planar with a side edge of the second glass substrate.

The display apparatus may include a case configured to support a rear surface of the first glass substrate. The case may have a side wall area and a support area that protrudes towards a center of the display panel in the second direction.

A first distance between the side edge of the first glass substrate and the side wall area in the second direction may be greater than a second distance between the side edge of the black matrix and the side wall area in the second direction.

The backlight unit may have a direct type structure or an edge type structure.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

The embodiments described below are provided for understanding of the disclosure, and it should be understood that various changes may be made without departing from the technical concepts of the disclosure. A detailed description of related art or configurations may be omitted so as to not obscure the technical concepts of the disclosure. In addition, the accompanying drawings may not be illustrated to scale, but may be illustrated with enlarged dimensions of some elements to improve clarity of the disclosure.

The terms used in the specification and claims are general terms in consideration of functions of the embodiments of the disclosure.

However, these terms may vary in accordance with the intention of those skilled in the art, precedent, technical interpretation, the emergence of new technologies, and the like. In addition, there may be some terms arbitrarily selected by the applicant. Such terms may be construed according to meanings defined in the present specification, and may also be construed based on general contents of the present specification and technical knowledge of the technical field in the absence of any specific definitions of the terms.

In the present disclosure, terms such as "comprise," "comprising," "may comprise," "include," "including," "have," "having," and the like, may be used herein to designate the presence of corresponding features (e.g., constituent elements such as a number, a function, an operation, or a part), and do not preclude the presence of additional features.

Further, in the present specification, elements for describing each embodiment of the disclosure are described, and accordingly, there is no limitation thereto. Therefore, some elements may be changed or omitted, and other elements may be added. In addition, the elements may be divided and disposed in different independent devices.

The embodiments of the disclosure will be described in detail with reference to the accompanying drawings and description in the accompanying drawings, but the disclosure is not limited by the embodiments.

Hereinafter, embodiments will be described in more detail with reference to the accompanying drawings.

Figure 1:
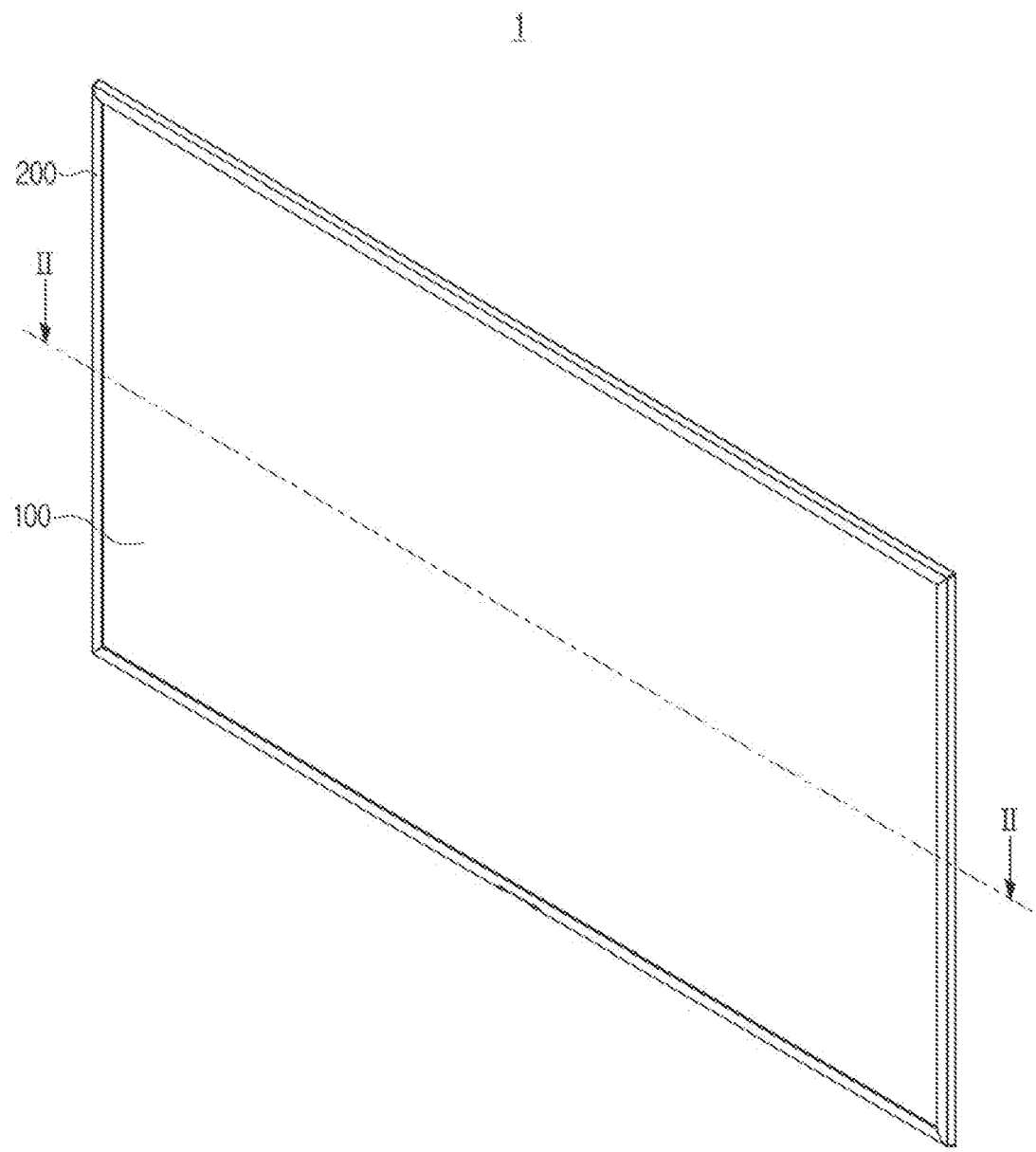
FIG. 1 is a perspective view illustrating a display apparatus according to an embodiment.
Figure 2:
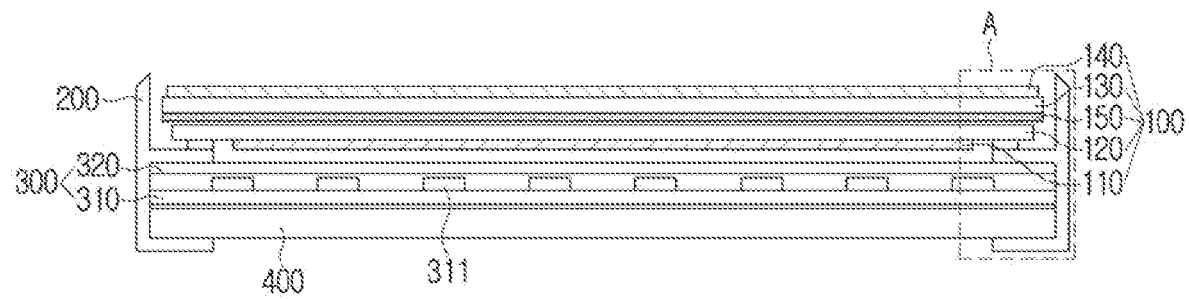
FIG. 2 is a cross-sectional view taken along line II-II of FIG. 1.
Figure 3:
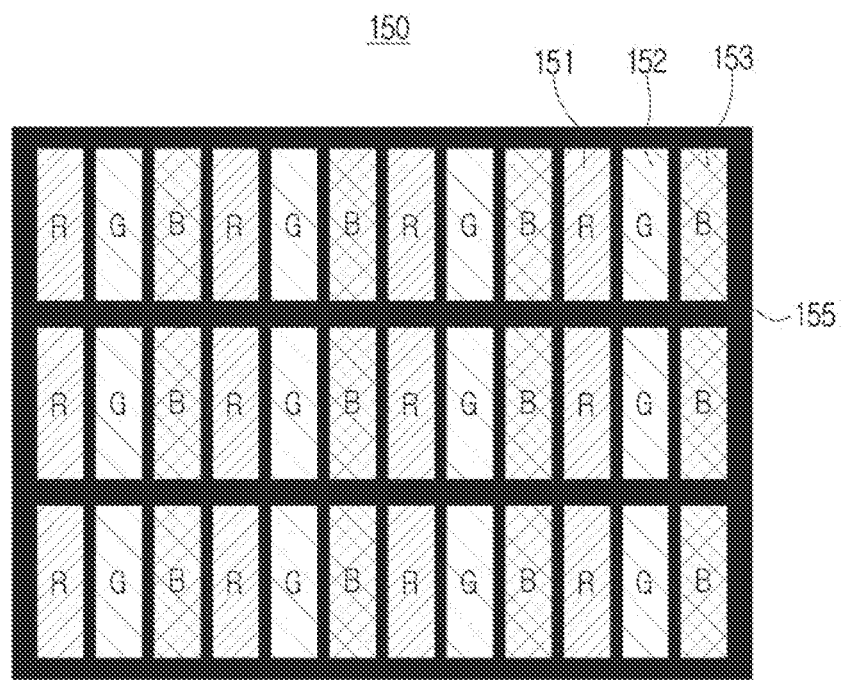
FIG. 3 is a diagram schematically illustrating a color filter layer according to an embodiment.

FIG. 1 is a perspective view illustrating a display apparatus according to an embodiment. FIG. 2 is a cross-sectional view taken along line II-II of FIG. 1. FIG. 3 is a diagram schematically illustrating a color filter layer according to an embodiment.

Referring to FIGS. 1, 2, and 3, a display apparatus 1 according to an embodiment of the disclosure may include a display panel 100, a case 200, a backlight unit 300, and a rear sash 400.

FIGS. 2, 4, 5, and 6 are plan views of the display apparatus 1. In the plan view, a "front direction" refers to a direction that extends towards the top of the page, a "rear direction" refers to a direction that extends towards a bottom of the page, and a "lateral direction" refers to a direction that extends towards sides of the page.

The display apparatus 1 may be an apparatus configured to receive an image signal from an external source, process the image signal, and visually display the processed image, and may be a television, a monitor, a mobile multimedia device, a mobile communication device, and the like, but is not limited thereto.

The display panel 100 may display various images towards a front direction based on an image signal received from an external source, and may be a liquid crystal display (LCD) panel. In addition, the display panel 100 may receive light from the backlight unit 300.

One or more embodiments of the present disclosure relate to the display panel 100 having an improved structure improved for preventing or reducing light leakage from side surfaces of the display panel 100, and the display apparatus 1 including the same.

The display panel 100 may have a structure in which a first polarization plate 110, a first glass substrate 120, a liquid crystal layer, a color filter layer 150, a second glass substrate 130, and a second polarization plate 140 are laminated in sequence.

The first polarization plate 110 may be provided behind the first glass substrate 120, and the second polarization plate 140 may be provided in front of the second glass substrate 130.

The first polarization plate 110 and the second polarization plate 140 may include polyvinyl alcohol (PVA), and a dichroic material in the polyvinyl alcohol for polarizing light in a specific direction.

The first polarization plate 110 may only transmit light vibrating in a first direction, and the second polarization plate 140 may only transmit light vibrating in a second direction that is orthogonal to the first direction. In other words, light may not pass through the first polarization plate 110 and the second polarization plate 140 at the same time.

In the first glass substrate 120, a data line and a gate line may be provided so as to intersect with each other, and a plurality of thin film transistors (TFTs) may be provided on an intersection of the data line and the gate line.

A signal voltage transferred from a driving circuit of the display apparatus 1 may be applied between a pixel electrode and a common electrode of the second glass substrate 130 via the TFT disposed on the first glass substrate 120, and accordingly, liquid crystals filled between the first glass substrate 120 and the second glass substrate 130 may be aligned according to the voltage, to determine transmittance of light.

For example, if an electric field is not applied to the liquid crystal layer, light polarized by the first polarization plate 110 may pass through the liquid crystal layer and then pass through the second polarization plate 140 due to the alignment of liquid crystal molecules of the liquid crystal layer. Alternatively, if an electric field is applied to the liquid crystal layer, the alignment of the liquid crystal molecules of the liquid crystal layer may change, and accordingly, the light polarized by the first polarization plate 110 may not pass through the second polarization plate 140.

The second glass substrate 130 may be provided in front of the first glass substrate 120 and the liquid crystal layer may be provided between the second glass substrate 130 and the first glass substrate 120.

The color filter layer 150 may be provided on a rear surface of the second glass substrate 130. The color filter layer 150 may include a plurality of color filters 151, 152, and 153 arranged uniformly, and a black matrix 155 surrounding each color filter 151, 152, and 153 of the plurality of color filters 151, 152, and 153.

The color filters 151, 152, and 153 may include a red (R) color filter 151, a green (G) color filter 152, and a blue (B) color filter 153 respectively corresponding to red, green, and blue which are three primary colors of light. A group of one R color filter 151, one G color filter 152, and one B color filter 153 may correspond to one pixel of the display panel 100.

The light passing through the liquid crystal layer may have a color by the plurality of color filters 151, 152, and 153 of the color filter layer 150, and the color filters 151, 152, and 153 with three colors may constitute one pixel, and accordingly, each pixel may express various colors.

The black matrix 155 may be provided between the color filters 151, 152, and 153 so that the color filters 151, 152, and 153 are separated from each other. In other words, the black matrix 155 may correspond to boundary areas between the color filters 151, 152, and 153.

The black matrix 155 may be provided in black, and absorb light. In other words, the black matrix 155 may prevent reflection of light incident from an external source, and also block interference between light rays which have passed through the color filters 151, 152, and 153.

The black matrix 155 may be include a metal material such as chromium (Cr), or an organic material such as carbon black.

The case 200 may support the display panel 100 and the backlight unit 300 from a side surface and form an appearance of the display apparatus 1. A specific shape and structure of the case 200 will be described below in detail.

The backlight unit 300 may be disposed on a rear side of the display panel 100, and may include a printed circuit board 310 and an optical sheet 320.

A plurality of light sources 311 configured to emit light towards a rear surface of the display panel 100 may be provided on the printed circuit board 310 to be spaced apart from each other. In other words, the backlight unit 300 according to an embodiment of the disclosure may have a direct type structure.

However, this is merely an example, and the backlight unit is not limited to the direct type structure, and may have an edge type structure in which the light sources 311 are provided on one side or both sides of a light guide plate, and a reflector sheet configured to guide light emitted from a side surface of the light guide plate upwards is provided.

The light source 311 may be a light emitting diode (LED) configured to emit light having different colors such as blue, green, and red, and may also be a cold cathode fluorescent lamp (CCFL), an external electrode fluorescent lamp (EEFL), or an organic light emitting diode (OLED).

The optical sheet 320 may have a structure in which at least one of a diffusion sheet, a prism sheet, a protective sheet, a dual brightness enhancement film (DBEF), and a quantum dot sheet are sequentially provided.

The diffusion sheet may diffuse and scatter light emitted from the light source 311 so that the entire color and brightness of the screen displayed through the display panel 100 are seen uniformly.

The prism sheet and the dual brightness enhancement film may refract or collect light diffused through the diffusion sheet to increase brightness, and the protective sheet may protect the diffusion sheet, the prism sheet, the dual brightness enhancement film, and components provided inside the display apparatus 1 from external impact or foreign materials.

The quantum dot sheet may contain quantum dots (QDs) that absorb light in various wavelength ranges, and scatter the light in a desired wavelength range. The QDs may be inorganic crystalline materials or fine holes having diameters of about tens of nanometers (nm) or less.

If the light source 311 emits white light, the light transmitted through the quantum dot sheet is scattered as light in various wavelength ranges containing red, green, and blue light, and therefore, it is possible to enhance color reproducibility of an image implemented on the display panel 100.

The rear sash 400 may cover a rear surface of the backlight unit 300 and have a substantially rectangular cross section. An edge of a rear surface of the rear sash 400 may be supported by the case 200, and wires, and the like, for driving the display apparatus 1 may be provided on a front surface thereof.

Figure 4:
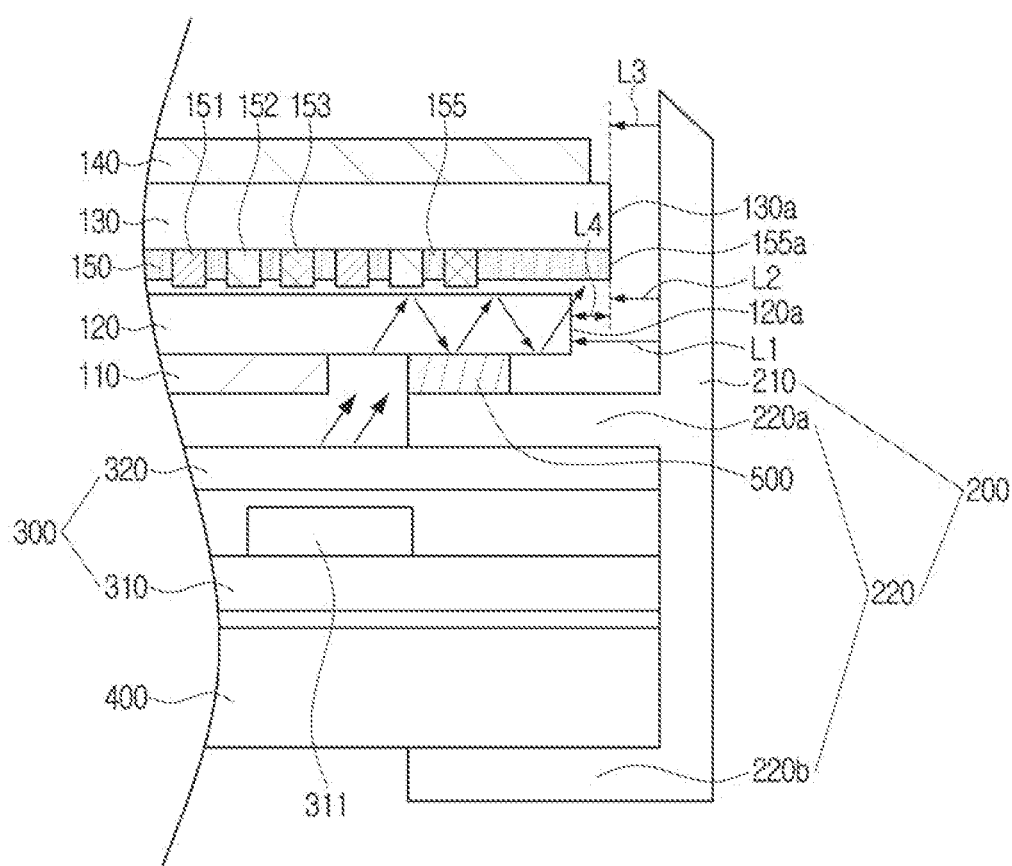
FIG. 4 is an enlarged cross-sectional view illustrating an A part of FIG. 2.

FIG. 4 is an enlarged cross-sectional view illustrating an part A of FIG. 2. Referring to FIG. 4, the case 200 may have a side wall area 210 and a support area 220.

The side wall area 210 may be provided to surround side surfaces of the display panel 100 and the backlight unit 300, and form the appearance of the display apparatus 1.

The support area 220 may protrude towards a center of the display apparatus 1 in the lateral direction, and may include a first support area 220a supporting the display panel 100 and a second support area 220b supporting the backlight unit.

The first support area 220a may support an edge of a rear surface of the first glass substrate 120 in front of the second support area 220b.

In addition, a bonding member 500 may be provided between a front surface of the first support area 220a and a rear surface of the first glass substrate 120 to fix the first glass substrate 120 in place. Specifically, the bonding member 500 may include a material having adhesiveness and adhere the first glass substrate 120 to the first support area 220a. Accordingly, the first glass substrate 120 may be stably supported by the case 200.

The second support area 220b may protrude towards the center of the display apparatus 1 in the lateral direction to support the edge of the rear surface of the rear sash 400. The second support area 220b may form the rear surface of the display apparatus 1 together with the rear sash 400.

Accordingly, the backlight unit 300 and the rear sash 400 may be stably supported by the second support area 220b.

Arrows illustrated in FIG. 4 may indicate a flow path of light emitted from the backlight unit 300. Specifically, the light emitted from the backlight unit 300 may be incident between the first polarization plate 110 and the bonding member 500, may be repeatedly and irregularly reflected inside of the first glass substrate 120, and may leak outside of the display panel 100 through a side edge 120a of the first glass substrate 120.

A side edge 155a of the black matrix 155 may extend beyond the side edge 102a of the first glass substrate 120 in the lateral direction by a predetermined distance L4. Specifically, the predetermined distance L4 may be about 0.2 mm to about 0.8 mm.

In other words, a distance L1 between the side edge 120a of the first glass substrate 120 and the side wall area 210 in the lateral direction may be greater than a distance L2 between the side edge 155a of the black matrix 155 and the side wall area 210 in the lateral direction.

Because the first glass substrate 120 has the shape described above, the light leaking through the first glass substrate 120 may be absorbed or shielded by the black matrix 155. Therefore, it is possible to prevent or reduce light leakage between the side surface of the display panel 100 and the side wall area 210.

In addition, the black matrix 155 may be provided to a side edge 130a of the second glass substrate 130. As illustrated in FIG. 3, the black matrix 155 may be formed in a size corresponding to the second glass substrate 130 so as to cover all of the remaining area excluding the area where the color filters 151, 152, and 153 are provided. In other words, the side edge 155a of the black matrix 155 may be planar with the side edge 130a of the second glass substrate 130.

In other words, the distance L2 between the side edge 155a of the black matrix 155 and the side wall area 210 in the lateral direction may be the same as a distance L3 between the side edge 130a of the second glass substrate 130 and the side wall area 210 in the lateral direction.

Because the side edge 155a of the black matrix 155 extends to the side edge 130a of the second glass substrate 130 as described above, the black matrix 155 effectively shields the light leaking to the side edge 120a of the first glass substrate 120.

Figure 5:
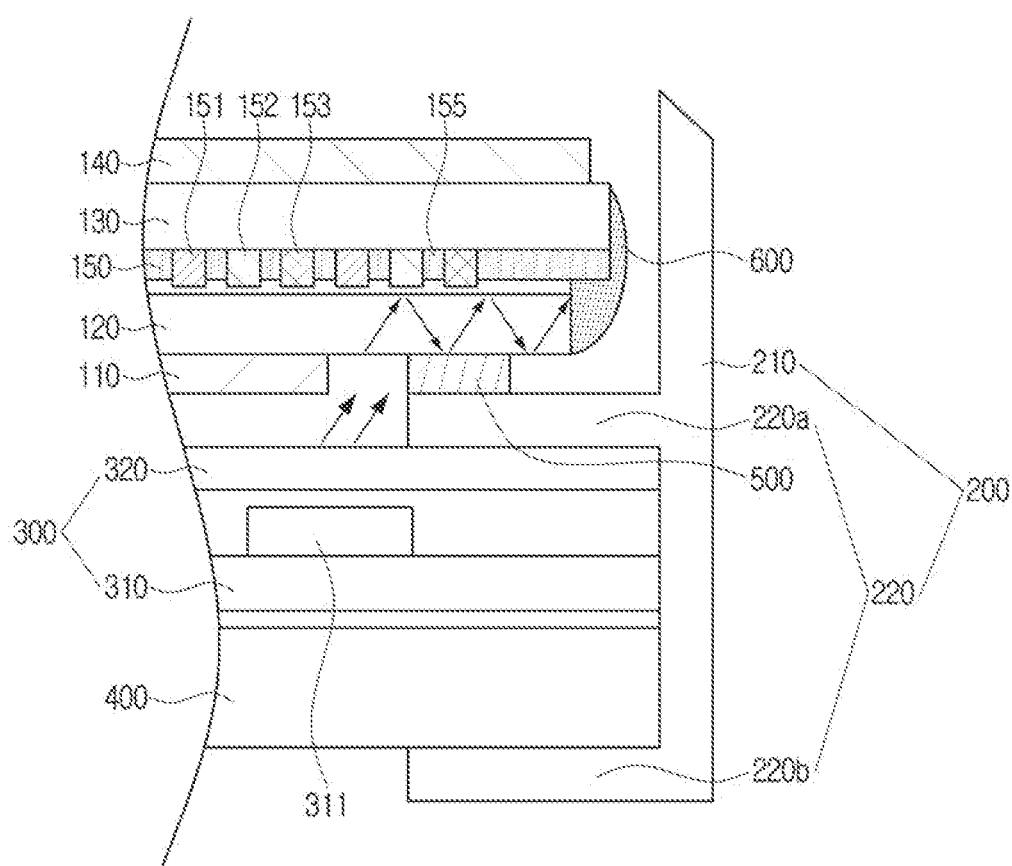
FIG. 5 is a cross-sectional view illustrating a state where a sealing member is disposed on a side surface of a display panel according to an embodiment.

FIG. 5 is a cross-sectional view illustrating a state where a sealing member 600 is provided on a side surface of the display panel 100. Referring to FIG. 5, the sealing member 600 may be provided so as to cover the side edge 120a of the first glass substrate 120 and the side edge 103a of the second glass substrate 130. However, the position where the sealing member 600 is provided is not limited thereto, and the sealing member 600 may be provided so as to cover only the side edge 120a of the first glass substrate 120.

The sealing member 600 may be black in order to absorb light. In addition, the sealing member 600 may be adhesive, and may be applied and fixed to the side surface of the display panel 100.

Because the sealing member 600 is provided so as to cover the side surface of the display panel 100, the sealing member 600 shields the light leaking externally through the side surface of the display panel 100.

Figure 6:
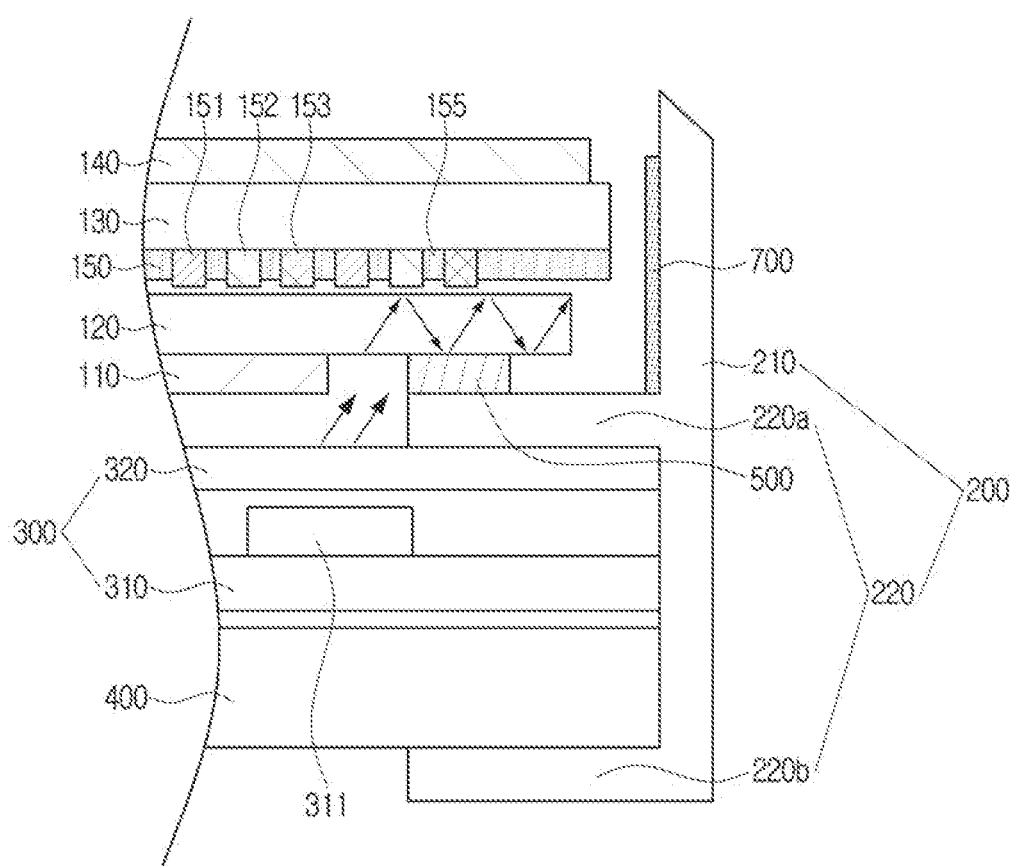
FIG. 6 is a cross-sectional view illustrating a state where a light shielding member is disposed on a side wall area of a case according to an embodiment.

FIG. 6 is a cross-sectional view illustrating a state where a light shielding member 700 is provided on the side wall area 210 of the case 200. The light shielding member 700 may be attached to an inner surface of the side wall area 210, and may to surround the side surface of the display panel 100.

The light shielding member 700 may be a coating layer formed of a black tape or light shielding material which absorbs light.

Therefore, even if some light that is not shielded by the black matrix 155 leaks towards the side wall area 210 of the case 200, the light is shielded by the light shielding member 700, thereby preventing or reducing light leakage.

While embodiments of the disclosure have been shown and described, the disclosure is not limited to the aforementioned embodiments, and it is apparent that various modifications can be made by those having ordinary skill in the technical field to which the disclosure belongs, without departing from the technical concept of the disclosure as claimed by the appended claims. Also, it is intended that modifications are to be covered by the appended claims.

What is claimed is:

1. A display panel comprising:
   a first glass substrate;
   a second glass substrate provided in front of the first glass substrate in a first direction;
   a color filter layer provided between the second glass substrate and the first glass substrate; and
   a sealing member;
   wherein the color filter layer comprises a plurality of color filters and a black matrix surrounding the plurality of color filters,
   wherein a side edge of the black matrix extends beyond a side edge of the first glass substrate in a second direction that is orthogonal to the first direction, and
   wherein the sealing member surrounds the side edge of the first glass substrate, the side edge of the black matrix and a side edge of the second glass substrate.

2. The display panel according to claim 1, wherein the side edge of the black matrix extends beyond the side edge of the first glass substrate by about 0.2 mm to about 0.8 mm.

3. The display panel according to claim 1, wherein the side edge of the black matrix is planar with the side edge of the second glass substrate.

4. The display panel according to claim 1, further comprising:
   a bonding member provided between the first glass substrate and a support area to fix the first glass substrate.

5. The display panel according to claim 1, further comprising:
   a first polarization plate provided behind the first glass substrate in the first direction; and
   a second polarization plate provided in front of the second glass substrate in the first direction,
   wherein the first glass substrate includes a thin film transistor.

6. A display apparatus comprising:
   a backlight unit;
   a display panel provided in front of the backlight unit in a first direction; and
   a case;
   wherein the display panel comprises:
      a first glass substrate;
      a second glass substrate provided in front of the first glass substrate in the first direction; and
      a color filter layer provided between the second glass substrate and the first glass substrate,
   wherein the color filter layer comprises a plurality of color filters and a black matrix surrounding the plurality of color filters,
   wherein a side edge of the black matrix extends beyond a side edge of the first glass substrate in a second direction that is orthogonal to the first direction,
   wherein the case comprises a side wall area, a first support area, and a second support area that protrude towards an inside of the side wall area,
   wherein a first distance between the side edge of the first glass substrate and the side wall area is greater than a second distance between the side edge of the black matrix and the side wall area in the second direction,
   wherein the first support area supports the first glass substrate and the second support area supports the backlight unit, and
   wherein the first support area is provided to be higher than the second support area in the first direction.

7. The display apparatus according to claim 6, wherein the side edge of the black matrix extends beyond the side edge of the first glass substrate by about 0.2 mm to about 0.8 mm.

8. The display apparatus according to claim 6, wherein the side edge of the black matrix is planar with the side edge of the second glass substrate.

9. The display apparatus according to claim 6, wherein the backlight unit has a direct type structure or an edge type structure.

10. A display apparatus comprising:
    a backlight unit configured to emit light;
    a color filter layer comprising a plurality of color filters and a black matrix surrounding the plurality of color filters;
    a glass substrate provided between the backlight unit and the color filter layer, and configured to internally reflect the light emitted by the backlight unit; and
    a case,
    wherein side edges of the black matrix extend beyond side edges of the glass substrate in a lateral direction of the display apparatus,
    wherein the case comprises:

a side wall area that surrounds a side surface of the backlight unit, the color filter layer, and the glass substrate, and a first support area and a second support area that protrude from the side wall area in the lateral direction, wherein the first support area supports the glass substrate and the second support area supports the backlight unit, and wherein the first support area is provided to be higher than the second support area.

11. The display apparatus according to claim 10, wherein the respective side edges of the black matrix extend beyond the respective side edges of the glass substrate by about 0.2 mm to about 0.8 mm.

12. The display apparatus according to claim 10, further comprising:

another glass substrate provided in front of the color filter layer, wherein the respective side edges of the black matrix are planar with respective side edges of the other glass substrate.

13. The display apparatus according to claim 10, further comprising:

a light shielding member provided on an inner surface of the case.

14. The display apparatus according to claim 10, further comprising:

another glass substrate provided in front of the color filter layer, wherein a sealing member surrounds the respective side edges of the other glass substrate.

* * * * *